(12) United States Patent
Gross et al.

(10) Patent No.: US 9,003,546 B2
(45) Date of Patent: Apr. 7, 2015

(54) SECURED DELETION OF INFORMATION

(71) Applicant: CA, Inc., Islandia, NY (US)

(72) Inventors: Miron Gross, Kfar Haoranim (IL); Eitan Hadar, Nesher (IL); Boaz Navott, Petach Tikva (IL); Itzhak Fadida, Haifa (IL)

(73) Assignee: CA, Inc., New York, NY (US)

( * ) Notice: Subject to any disclaimer, the term of this patent is extended or adjusted under 35 U.S.C. 154(b) by 0 days.

(21) Appl. No.: 13/655,251

(22) Filed: Oct. 18, 2012

(65) Prior Publication Data

US 2014/0115709 A1 Apr. 24, 2014

(51) Int. Cl.
*G06F 21/60* (2013.01)
*G06F 21/62* (2013.01)
*H04L 29/06* (2006.01)

(52) U.S. Cl.
CPC ........ *G06F 21/60* (2013.01); *G06F 2221/2143* (2013.01); *G06F 2221/2149* (2013.01); *G06F 21/62* (2013.01); *H04L 63/20* (2013.01)

(58) Field of Classification Search
CPC .................................................. G06F 11/0781
USPC .................. 726/1, 7, 15, 22, 26, 34
See application file for complete search history.

(56) References Cited

U.S. PATENT DOCUMENTS

| | | | | |
|---|---|---|---|---|
| 5,960,084 A | * | 9/1999 | Angelo | 713/185 |
| 6,070,174 A | * | 5/2000 | Starek et al. | 1/1 |
| 7,895,403 B1 | * | 2/2011 | Tormasov et al. | 711/154 |
| 2009/0205050 A1 | * | 8/2009 | Giordano et al. | 726/26 |
| 2011/0231607 A1 | * | 9/2011 | Gao et al. | 711/115 |

* cited by examiner

*Primary Examiner* — Josnel Jeudy
(74) *Attorney, Agent, or Firm* — Baker Botts L.L.P.

(57) ABSTRACT

Secure deletion of a storage device includes monitoring the storage device, determining whether a predetermined condition occurs, and accessing the storage device when it is determined that the predetermined condition occurs. Further, deleted information to be securely wiped is identified in accordance with a predetermined unified policy for a virtual environment comprising the storage device. Alternatively, information being deleted is intercepted when it is determined that the information being deleted satisfies a predetermined condition. The identified or intercepted deleted information is securely wiped from the storage device by filling a portion of the storage device associated with the deleted information with zero bytes before the deleted information is marked as deleted. The secured wiping of deleted information may occur in accordance with a predetermined enterprise-wide policy.

18 Claims, 5 Drawing Sheets

SECURED DELETION OF INFORMATION

BACKGROUND

The present disclosure relates to secured management of information, and more specifically, to secured deletion of information from storage devices in transient active and dormant states.

When information is deleted from a storage drive, the information is marked as deleted, but the deleted information may be retrieved using a variety of tools, such as undelete tools. Free space on a storage drive may be examined and a user may discover prior stored information that was deleted. Thus, vulnerabilities may exist that allow an unauthorized user to access deleted information. For example, vulnerabilities may exist during provisioning, de-provisioning, powering on, and powering off of a virtual machine or storage device. Further, when migrating a virtual machine, the memory including the deleted information may be exposed.

BRIEF SUMMARY

According to one aspect of the disclosure, secure deletion of information in a storage device may include monitoring the storage device, determining whether a predetermined condition occurs, and accessing the storage device when it is determined that the predetermined condition occurs. Further, deleted information to be securely wiped may be identified in accordance with a predetermined unified policy for a virtual environment comprising the storage device. The identified deleted information may be securely wiped from the storage device by filling a portion of the storage device associated with the deleted information with zero bytes before the deleted information is marked as deleted.

According to another aspect of the disclosure, secure deletion of information in a storage device may include monitoring the storage device and determining whether information being deleted satisfies a predetermined condition. The information being deleted may be intercepted when it is determined that the information being deleted satisfies the predetermined condition. The intercepted deleted information may be securely wiped from the storage device by filling a portion of the storage device associated with the deleted information with zero bytes before the deleted information is marked as deleted. The secured wiping of deleted information may occur in accordance with a predetermined enterprise-wide policy.

According to another aspect of the disclosure, a secure deletion system may include a monitoring unit configured to monitor a storage device and a determining unit configured to determine whether a predetermined condition occurs. Further, an accessing unit may be configured to access the storage device when it is determined that the predetermined condition occurs. The secure deletion system also may include an identifying unit configured to identify deleted information to be securely wiped in accordance with a predetermined unified policy for a virtual environment comprising the storage device. A wiping unit of the secure deletion system may be configured to securely wipe the deleted information identified by the identifying unit from the storage device by filling a portion of the storage device associated with the deleted information with zero bytes before the deleted information is marked as deleted.

According to a further aspect of the disclosure, a secure deletion system may include a monitoring unit configured to monitor a storage device and a determining unit configured to determine whether information being deleted satisfies a predetermined condition. The secure deletion system also may include an intercepting unit configured to intercept information being deleted when it is determined that the predetermined condition is satisfied. A wiping unit of the secure deletion system may be configured to securely wipe the intercepted deleted information from the storage device by filling a portion of the storage device associated with the deleted information with zero bytes before the deleted information is marked as deleted. Further, the wiping unit may be configured to securely wipe deleted information in accordance with a predetermined enterprise-wide policy.

According to yet another aspect of the disclosure, a computer program product may include a computer readable storage medium having computer readable program code embodied therewith. The computer readable program code may include computer readable program code configured to monitor a storage device and computer readable program code configured to determine whether a predetermined condition occurs. The computer readable program code also may include computer readable program code configured to access the storage device when it is determined that the predetermined condition occurs. Further, the computer readable program code may be configured to securely wipe deleted information from the storage device by filling a portion of the storage device associated with the deleted information with zero bytes before the deleted information is marked as deleted, in accordance with a unified policy for a virtual environment comprising the storage device.

According to still another aspect of the disclosure, a computer program product may include a computer readable storage medium having computer readable program code embodied therewith. The computer readable program code may include computer readable program code configured to monitor a storage device and computer readable program code configured to determine whether information being deleted satisfies a predetermined condition. The computer readable program code also may include computer readable program code configured to intercept information being deleted when it is determined that the predetermined condition is satisfied. Further, the computer readable program code may be configured to securely wipe the intercepted deleted information from the storage device by filling a portion of the storage device associated with the deleted information with zero bytes before the deleted information is marked as deleted, in accordance with a predetermined enterprise-wide policy.

Objects, features, and advantages of aspects of the disclosure will be apparent to persons of ordinary skill in the art from the following description and the accompanying drawings.

BRIEF DESCRIPTION OF THE DRAWINGS

Aspects of the present disclosure are illustrated by way of example and are not limited by the accompanying figures with like references indicating like elements.

DETAILED DESCRIPTION

Figure 1:
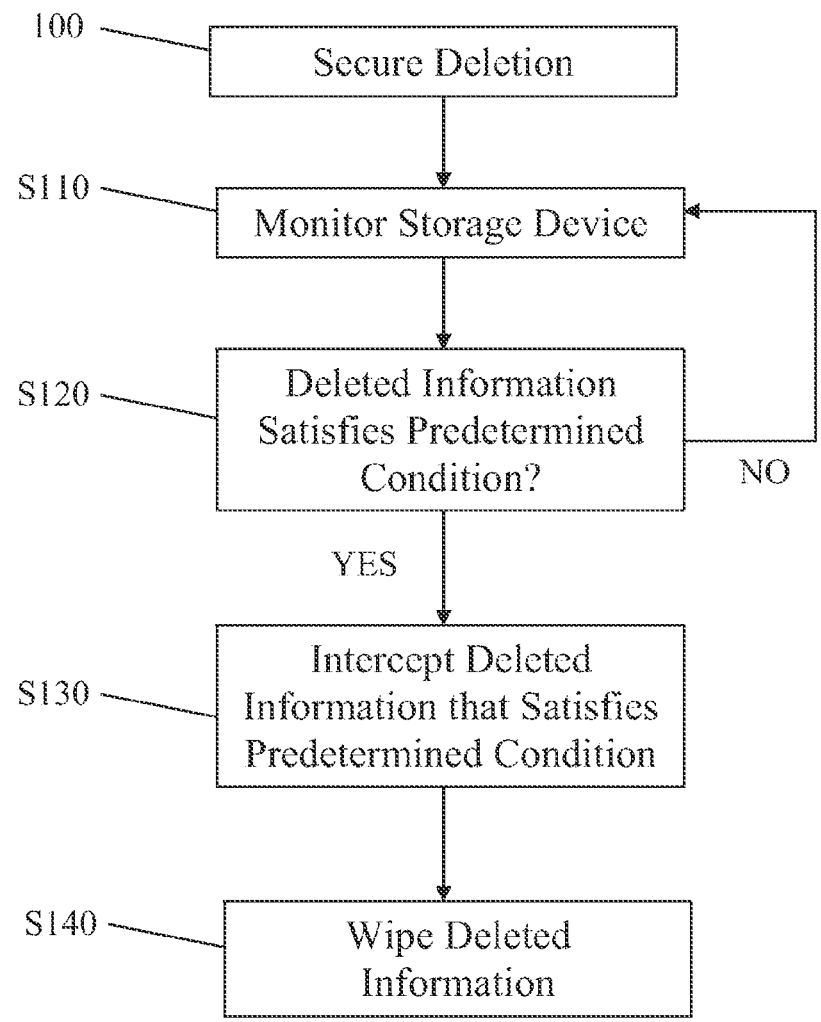
FIG. 1 is a flowchart depicting a process, according to an embodiment.

As will be appreciated by one skilled in the art, aspects of the present disclosure may be illustrated and described herein in any of a number of patentable classes or context including any new and useful process, machine, manufacture, or composition of matter, or any new and useful improvement thereof Accordingly, aspects of the present disclosure may be implemented entirely hardware, entirely software (including firmware, resident software, micro-code, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples on-exhaustive list) of the computer readable storage medium would include the following: a portable computer diskette, a hard disk, a random access memory (RAM), a read-only memory (ROM), an erasable programmable read-only memory' (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language, such as JAVA®, SCALA®, SMALLTALK®, EIFFEL®, JADE, EMERALD®, C++, C#, VB.NET, PYTHON® or the like, conventional procedural programming languages such as the "C" programming language, VISUAL BASIC®, FORTRAN® 2003, Perl, COBOL 2002, PHP, ABAP®, dynamic programming languages such as PYTHON®, RUBY® and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatuses (systems) and computer program products according to aspects of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

According to an embodiment, complete and permanent information deletion from data stores, e.g., virtual disks, network storage, backups, databases, and files, may be enabled, for example, while the image is in a transient state, while it is not mounted on the system as a file, or during phases in which the storage or image are not in active mode. Thus, management of the storage device may be secure during operation of the system, in real-time. The storage size and network traffic also may be reduced, thereby enabling a more efficient infrastructure.

When storage resources are being accessed, the system may intercept discarded information in real-time and may provide secure deletion of the discarded information, such that the information cannot be retrieved, by filling deleted files with zero bytes before the deleted files are marked as deleted. Thus, a delete command may be replaced by a "write zero" command, which supersedes the original delete command. The "write zero" command may send a chain of "zeros" to a portion of memory associated with the deleted information or file.

Because this method ensures that the deleted information is completely and permanently removed from storage, storage and network resources may be saved and more efficiently utilized. Once the used memory is wiped as described above, the memory may be returned to the overall pool of memory.

Referring to FIG. 1, a process 100 for secure deletion of storage devices (e.g., virtual disks, network storage, backups, databases, and files) may be implemented in a processing device or computer, e.g., a personal computer, a server, a mobile device, a processor, or the like. The storage device may be constantly monitored at S110. This monitoring may occur while the storage device receives power (e.g., active state) and while the storage device is powered off.

At S120, it may be determined whether information being deleted satisfies a predetermined condition or policy. The predetermined condition may be, for example, a file type, a targeted directory, a security level, a date created or modified, a file size, or combinations thereof. If the information being deleted satisfies the predetermined condition, the information being deleted may be intercepted at S130. This interception may occur on the virtual machine level or on the host level or directly on the storage device. If the information being deleted does not satisfy the predetermined condition, the information may not be intercepted and the storage device may continue to be monitored (i.e., the process may return to S110).

At S140, the deleted information that has been intercepted may be securely wiped by filling a portion of the storage device associated with the deleted information with zero bytes before the deleted information may be marked as deleted. Alternatively, a portion of the storage device associated with the deleted information may be filled with, for example, one byte or a predetermined string of data. The wiping at S140 may occur in accordance with a predetermined enterprise-wide policy, described in more detail below. The policy may allow selective wiping according to a type of information, a group of users, or a user type. The policy may enable collective wiping of all deleted information. The policy may provide for periodic wiping according to a predetermined event, a privacy regulation, or a predetermined time period. The policy may enable central wiping protection that prevents wiping of deleted information according to a records protection scheme. Alternatively, all deleted information that is intercepted may be wiped at S140 without a policy implemented. After secure wiping occurs, the intercepted deleted information may be released or returned and the device or operating system may delete the information.

Figure 2:
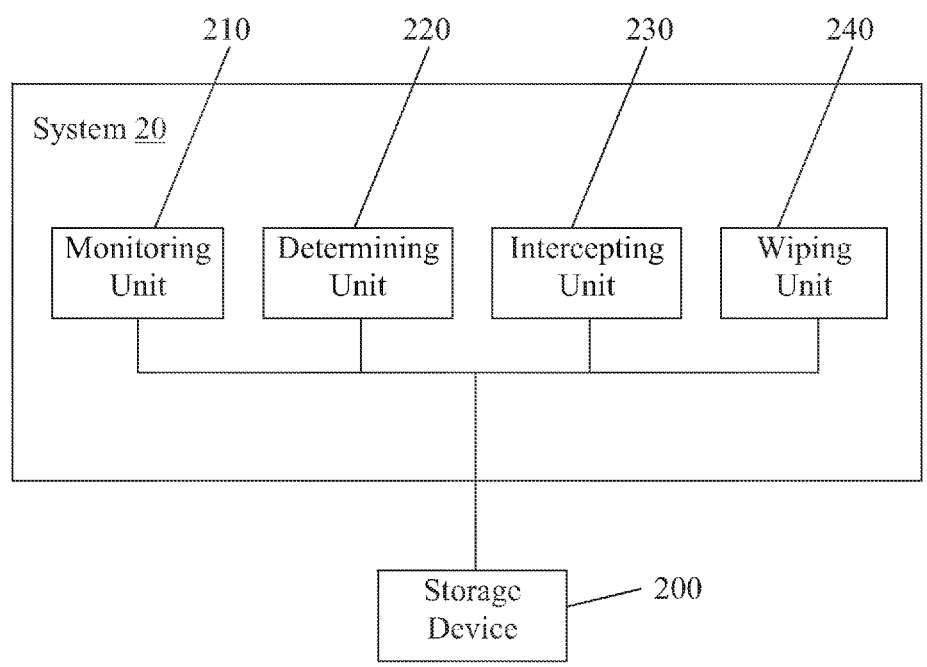
FIG. 2 is a diagram depicting a system, according to another embodiment.

Referring to FIG. 2, a system 20 that may implement process 100 for secure deletion of a storage device 200 is depicted. System 20 may include a monitoring unit 210 configured to monitor storage device 200. A determining unit 220 may be configured to determine whether information being deleted satisfies a predetermined condition. An intercepting unit 230 may be configured to intercept information being deleted from storage device 200 when determining unit 220 determines that the predetermined condition is satisfied. A wiping unit 240 may be configured to securely wipe the deleted information intercepted by intercepting unit 230 from storage device 200 by filling a portion of storage device 200 associated with the deleted information intercepted by intercepting unit 230 with zero bytes before the deleted information is marked as deleted. Further, wiping unit 240 may be configured to securely wipe deleted information in accordance with a predetermined enterprise-wide policy, described in more detail below.

Even when storage resources are not being accessed (e.g., a dormant state), the system may ensure that the deleted information will be irretrievable. In addition, using this procedure may reduce the storage size and the network traffic.

The secured deletion may be implemented according to a unified policy, rather than policies on specific disks, which requires installation of tools on various virtual machines in a heterogeneous environment. The unified policy may be applicable to an entire cloud dynamic infrastructure, across hybrid domains, and may account for a variety of scenarios. For example, secured deletion may be ensured in multitenant conditions in which information may not be shared between tenants. Another example is ensuring secured deletion in a multi-user environment, such that when one user logs out and a second user logs in, the second user may be prevented from recovering deleted information of the first user. In addition, the system may provide secure deletion of a tenant's information from all the locations on which the information resided, regardless of technology, vendor, or other environment specifics.

Figure 3:
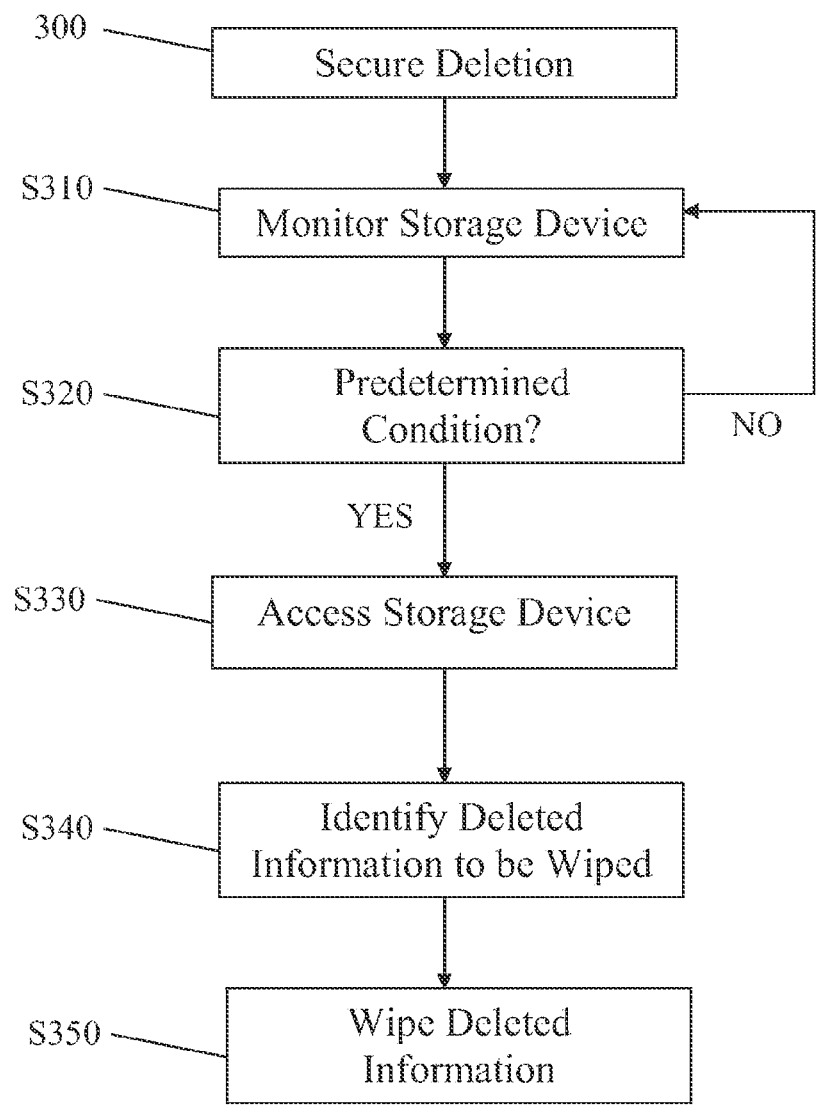
FIG. 3 is a flowchart depicting a process, according to yet another embodiment.

Referring to FIG. 3, a process 300 for secure deletion of storage devices (e.g., virtual disks, network storage, backups, databases, and files) may be implemented in a processing device or computer, e.g., a personal computer, a server, a mobile device, a processor, or the like. The storage device may be constantly monitored at S310. This monitoring may occur while the storage device receives power and while the storage device is powered off (e.g., transient or dormant state).

At S320, it may be determined whether a predetermined condition occurs. The predetermined condition may be, for example, power off, power on, provisioning, de-provisioning, log off, or log on (i.e., a state change). For example, the instant a user logs off a storage device or the instant a storage device is powered off may be identified by the monitoring, so that deleted information may be wiped before another user gains access if the predetermined condition is satisfied, the storage device may be accessed at S330. Further, the storage device may be scanned to find deleted information. If the predetermined condition is not satisfied, the storage device may not be accessed and the storage device may continue to be monitored (i.e., the process may return to S310).

At S340, deleted information to be securely wiped may be identified in accordance with a predetermined unified policy, described in more detail below. The unified policy may be predetermined for a virtual environment including the storage device. At S350, the identified deleted information may be securely wiped from the storage device by filling a portion of the storage device associated with the deleted information with zero bytes before the deleted information may be marked as deleted. Alternatively, all deleted information may be securely wiped at S350 without a policy implemented.

Figure 4:
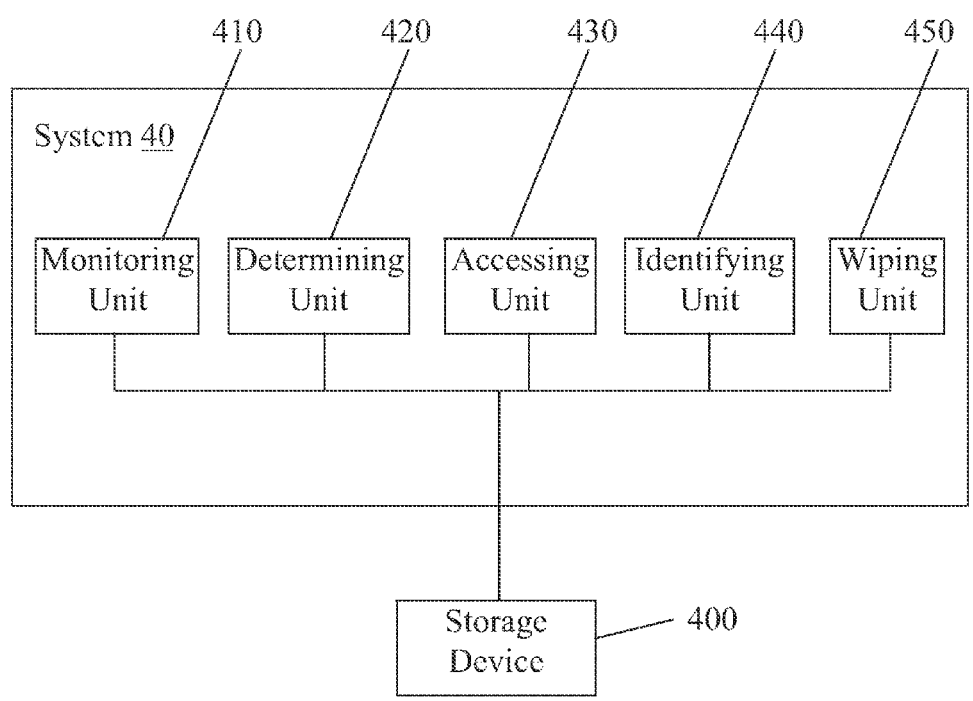
FIG. 4 is a diagram depicting a system, according to a further embodiment.

Referring to FIG. 4, a system 40 that may implement process 300 for secure deletion of a storage device 400 is depicted. System 40 may include a monitoring unit 410 configured to monitor storage device 400. A determining unit 420 may be configured to determine whether a predetermined condition occurs. The predetermined condition may be, for example, power off, power on, provisioning, de-provisioning, log off, or log on. An accessing unit 430 may be configured to access the storage device 400 when determining unit 420 determines that the predetermined condition occurs. An identifying unit 440 may be configured to identify deleted information to be securely wiped in accordance with a predetermined unified policy. The unified policy may be predetermined for a virtual environment including storage device 400. A wiping unit 450 may be configured to securely wipe the deleted information identified by identifying unit 440 from storage device 400 by filling a portion of storage device 400 associated with the deleted information identified by identifying unit 440 with zero bytes before the deleted information is marked as deleted.

According to the embodiments described above, a unified policy or enterprise-wide policy may be predetermined and may be applied to all managed images or virtual machines from a central location or server. For example, the policy may allow selective wiping according to a type of information, a group of users, or a user type. The policy may enable collective wiping of all deleted information. The policy may provide for periodic wiping according to predetermined events, privacy regulations, or predetermined time period. In an embodiment, the policy may enable central wiping protection that prevents wiping of deleted information according to a records protection scheme. Accordingly, if particular files or information are protected, required for records management, or otherwise should not be permanently deleted, the policy may prevent the secure deletion for those particular files or information. While certain examples of policies have been provided, the policy may include a combination of these examples, and these examples are non-limiting. Alternative policies will be apparent to one of ordinary skill in the art, based on the environment in which the system is implemented.

According to an embodiment, the system may orchestrate one or more of the various policies during provisioning and de-provisioning of virtual machine storage for a cloud infrastructure. Thus, when virtual machine storage requires provisioning or de-provisioning, the system may react by applying one or more storage security policies to ensure that deleted information becomes irretrievable and that protected information is not deleted unintentionally.

In accordance with embodiments described above, systems may use live interception filters to intercept discarded information and render it irretrievable, while reducing the amount of storage and network traffic. In addition, systems may render unusable discarded information for storage of dormant virtual machines. Systems may monitor and intercept discarded information while provisioning or de-provisioning or while powering on or powering off. Thus, systems may react to policies to determine whether to render discarded information unusable or protect the information from being erased and suggest s system change. Further, systems may automate wiping of free space, according to policies, in the entire virtual environment. Systems may control erasing across the virtual environment, across vendors, and across technologies in heterogeneous environments, from a central location of information protection. Accordingly, systems may enable wiping of free space, without installing a component on each virtual machine, when the virtual drive is not in use and may reduce usage of storage and network traffic.

Figure 5:
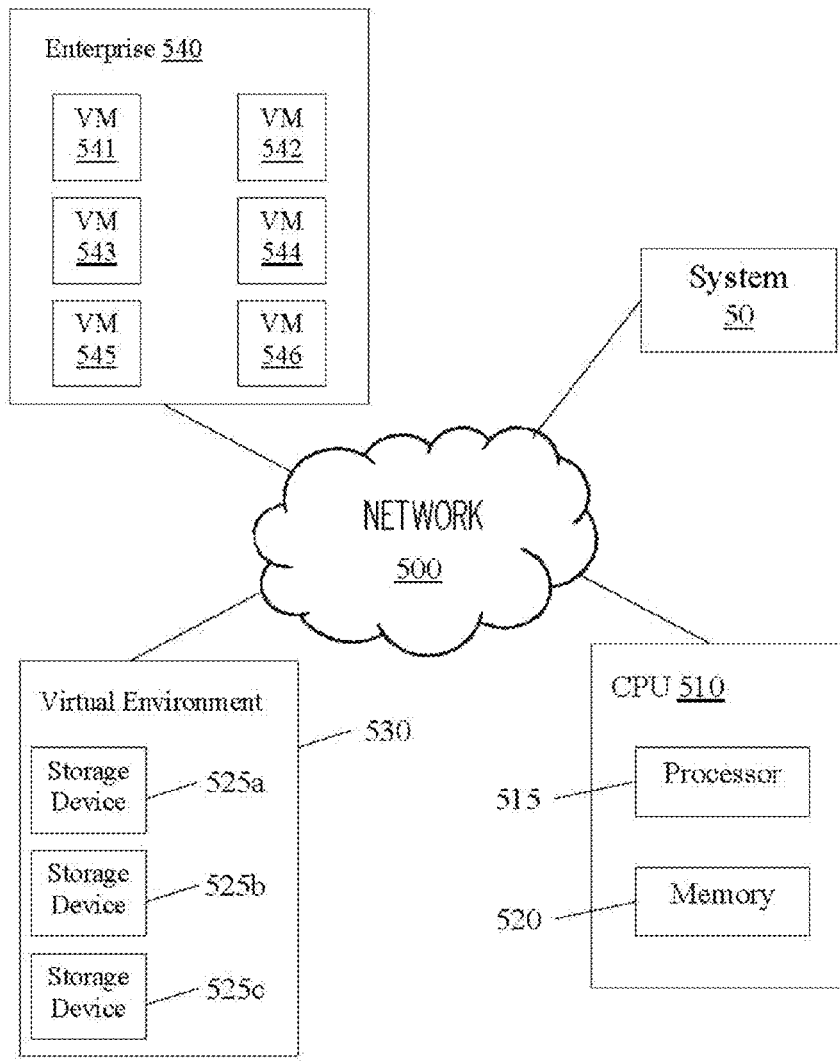
FIG. 5 is a diagram depicting examples of systems and apparatus of the present disclosure.

Referring to FIG. 5, a network 500 for service providers and consumers of provided services is depicted. A system 50, which may include system 20 or system 40, is depicted and may be connected to network 500. In addition, a computing device 510 is depicted, which may comprise a processor 515 and a memory 520. Computing device 510 may be a server, a personal computer, a general purpose computing device, a mobile device, a wireless device, or the like. Memory 520 may be a computer readable storage medium. Further, a virtual environment 530 may include a first storage device 525*a*, a second storage device 525*b*, and a third storage device 525*c*. Virtual environment 530 may include greater than or less than the three storage devices depicted in FIG. 5. Moreover, an enterprise 540 may be designated to include a virtual machine 541. Enterprise 540 may include a plurality of virtual machines, 541-546. Enterprise 540 may include greater than or less than the six virtual machines depicted in FIG. 5.

The flowchart and block diagrams in the Figures illustrate the architecture, functionality, and operation of possible implementations of systems, methods, and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "and" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure the form disclosed. Many modifications and variations will be apparent to those of ordinary skill the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

What is claimed is:

1. A method, comprising: monitoring a storage device; determining whether a predetermined condition occurs; accessing the storage device when it is determined that the predetermined condition occurs; identifying deleted information to be securely wiped in accordance with a predetermined unified policy for a virtual environment comprising the storage device; securely deleting the deleted information to be securely wiped from the storage device by wiping a portion of the storage device associated with the deleted information before the deleted information is marked as deleted, wherein the unified policy comprises at least one of: selective wiping according to a type of information, a group of users, or a user type; collective wiping of all deleted information; periodic wiping according to a predetermined event, a privacy regulation, or a predetermined time period; and central wiping protection that prevents wiping of deleted information according to a records protection scheme.

2. The method of claim 1, wherein wiping a portion of the storage device associated with the deleted information comprises filling a portion of the storage device associated with the deleted information with zero bytes.

3. The method of claim 1, wherein the predetermined condition comprises at least one of power off, power on, provisioning, de-provisioning, log off, and log on.

4. A method, comprising: monitoring a storage device; determining whether deleted information satisfies a predetermined condition; intercepting the deleted information when it is determined that the predetermined condition is satisfied; securely deleting the deleted information that is intercepted from the storage device by wiping a portion of the storage device associated with the deleted information before the deleted information is marked as deleted, wherein securely wiping the deleted information occurs in accordance with a predetermined enterprise-wide policy, wherein the predetermined enterprise-wide policy comprises at least one of: selective wiping according to a type of information, a group of users, or a user type; collective wiping of all deleted information; periodic wiping according to a predetermined event, a privacy regulation, or predetermined time period; and central wiping protection that prevents wiping of deleted information according to a records protection scheme.

5. The method of claim 4, wherein wiping a portion of the storage device associated with the deleted information comprises filling a portion of the storage device associated with the deleted information with zero bytes.

6. The method of claim 4, wherein the predetermined condition comprises at least one of: a file type, a targeted directory, a security level, a date created, a date modified, and a file size.

7. A system, comprising: a monitoring unit configured to monitor a storage device; a determining unit configured to determine whether a predetermined condition occurs; an accessing unit configured to access the storage device when it is determined that the predetermined condition occurs; an identifying unit configured to identify deleted information to be securely wiped in accordance with a predetermined unified policy for a virtual environment comprising the storage device a wiping unit configured to securely delete the deleted information identified by the identifying unit from the storage device by wiping a portion of the storage device associated with the deleted information before the deleted information is marked as deleted, wherein the unified policy comprises at least one of: selective wiping according to a type of information, a group of users, or a user type; collective wiping of all deleted information; periodic wiping according to a predetermined event, a privacy regulation, or a predetermined time period; and central wiping protection that prevents wiping of deleted information according to a records protection scheme.

8. The system of claim 7, wherein wiping a portion of the storage device associated with the deleted information comprises filling a portion of the storage device associated with the deleted information with zero bytes.

9. The system of claim 7, wherein the predetermined condition comprises at least one of: power off, power on, provisioning, de-provisioning, log off, and log on.

10. A system, comprising: a monitoring unit configured to monitor a storage device; a determining unit configured to determine whether deleted information satisfies a predetermined condition; an intercepting unit configured to intercept the deleted information when it is determined that the predetermined condition is satisfied; a wiping unit configured to securely delete the deleted information from the storage device by wiping a portion of the storage device associated with the deleted information before the deleted information is marked as deleted, wherein the wiping unit is configured to securely wipe deleted information in accordance with a predetermined enterprise-wide policy, wherein the predetermined enterprise-wide policy comprises at least one of: selective wiping according to a type of information, a group of users, or a user type; collective wiping of all deleted information; periodic wiping according to a predetermined event, a privacy regulation, or predetermined time period; and central wiping protection that prevents wiping of deleted information according to a records protection scheme.

11. The system of claim 10, wherein wiping a portion of the storage device associated with the deleted information comprises filling a portion of the storage device associated with the deleted information with zero bytes.

12. The system of claim 10, wherein the predetermined condition comprises at least one of: a file type, a targeted directory, a security level, a date created, a date modified, and a file size.

13. A computer program product comprising: a non-transitory computer readable storage medium having computer readable program code embodied therewith, the computer readable program code comprising: computer readable program code configured to monitor a storage device; computer readable program code configured to determine whether a predetermined condition occurs; computer readable program code configured to access the storage device when it is determined that the predetermined condition occurs; computer readable program code configured to securely delete deleted information from the storage device by wiping a portion of the storage device associated with the deleted information before the deleted information is marked as deleted, in accordance with a unified policy for a virtual environment comprising the storage device, wherein the unified policy comprises at least one of: selective wining according to a type of information, a group of users, or a user type; collective wining of all deleted information; periodic wining according to a predetermined event, a privacy regulation, or a predetermined time period; and central wining protection that prevents wiping of deleted information according to a records protection scheme.

14. The computer program product of claim 13, wherein wiping a portion of the storage device associated with the deleted information comprises filling a portion of the storage device associated with the deleted information with zero bytes.

15. The computer program product of claim 13, wherein the predetermined condition comprises at least one of: power off, power on, provisioning, de-provisioning, log off, and log on.

16. A computer program product comprising: a non-transitory computer readable storage medium having computer readable program code embodied therewith, the computer readable program code comprising: computer readable program code configured to monitor a storage device; computer readable program code configured to determine whether deleted information satisfies a predetermined condition; computer readable program code configured to intercept the deleted information when it is determined that the predetermined condition is satisfied; computer readable program code configured to securely delete the deleted information from the storage device by wiping a portion of the storage device associated with the deleted information before the deleted information is marked as deleted, in accordance with a predetermined enterprise-wide policy, wherein the predetermined enterprise-wide policy comprises at least one of: selective wiping according to a type of information, a group of users, or a user type; collective wiping of all deleted information; periodic wiping according to a predetermined event, a privacy regulation, or predetermined time period; and central wiping protection that prevents wiping of deleted information according to a records protection scheme.

17. The computer program product of claim 16, wherein wiping a portion of the storage device associated with the deleted information comprises filling a portion of the storage device associated with the deleted information with zero bytes.

18. The computer program product of claim 16, wherein the predetermined condition comprises at least one of a file type, a targeted directory, a security level, a date created, a date modified, and a file size.

* * * * *